A. HEIM.
HOSE REEL.
APPLICATION FILED AUG. 31, 1914.
1,156,402.
Patented Oct. 12, 1915.
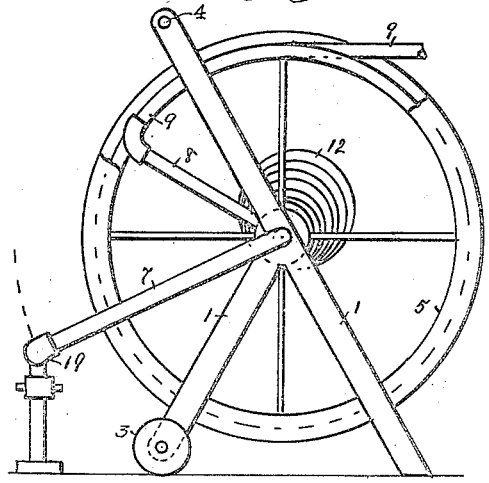
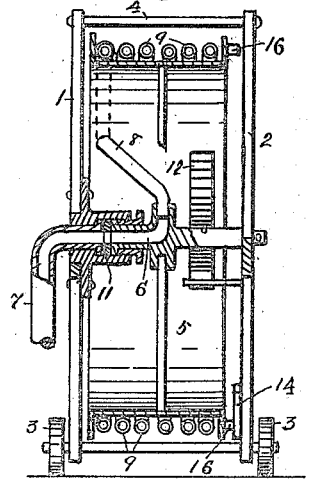
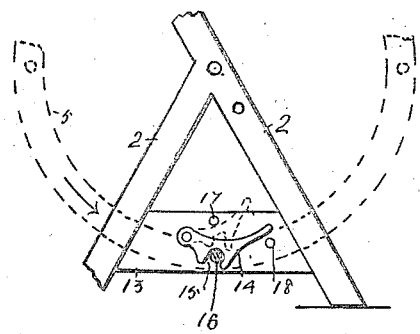
WITNESSES:
James J. Carr
Samuel S. Carr
Adam Heim, INVENTOR.
BY Robert S. Carr,
ATTORNEY.

UNITED STATES PATENT OFFICE.

ADAM HEIM, OF CONNERSVILLE, INDIANA.

HOSE-REEL.

1,156,402.  Specification of Letters Patent.  Patented Oct. 12, 1915.

Application filed August 31, 1914. Serial No. 859,324.

*To all whom it may concern:*

Be it known that I, ADAM HEIM, a citizen of the United States, residing at Connersville, Indiana, have invented a new and useful Improvement in Hose-Reels, of which the following is a specification.

My invention relates to hose reels of the class adapted to the use of garden hose or for other suitable purposes, and the objects of my improvements are to provide automatic mechanism for winding the hose on the drum; to provide automatic means for locking said mechanism out of action at predetermined intervals; to supply the water under pressure to the hose through the axis of the drum, and to provide simple and durable construction and assemblage of coacting members for securing facility of operation and efficiency of action. These objects may be attained in the following described manner as illustrated in the accompanying drawings, in which:

Figure 1 is a side elevation of a hose reel embodying my improvements; Fig. 2 a diametrical vertical section, and Fig. 3 an elevation of the automatic latch for locking the drum out of action.

In the drawings, 1 and 2 represent respective sides of the supporting frame mounted on wheels 3 and connected together near their upper ends by means of a handle 4 for wheeling the truck about as desired. The drum 5 journaled between the side frames, is formed with an axial opening 6 through one end of its hub for the flow of water under pressure from the supply pipe 7 to the tubular connection 8 with the discharge hose 9 which encircles the drum. Said axial opening is provided with an ordinary packing box 11 where it connects with the supply pipe to prevent leakage.

A coiled spring 12 secured to its axis serves to automatically turn the drum in the direction of the arrow for winding the hose 9 thereon. A brace 13, spanning the legs of the frame 2, is provided with a gravity latch 14 pivotally secured thereto and formed with an inclined notch 15 for detachably engaging with the pins 16 which project from the adjacent end of the drum. Stops 17 and 18 serve to limit the movement of the latch as shown in Fig. 3. The supply pipe 7 may be provided with a universal joint 19 adapted to engage at any angle with the spout of a hydrant or other connection with a supply of water under pressure.

In operation, for sprinkling or other purposes, the supply pipe should be connected with the source of water supply and the hose unwound from the drum as desired. The engagement of a pin on the drum with the inclined gravity latch serves to lock the drum from turning slowly under the exertion of the spring. When desired to rewind the hose, a slight further pull thereon will release the pin from the notch in the latch and by then releasing the hose will permit the action of the spring to turn the drum at such speed that the latch will ride over the pins without the notch becoming engaged therewith.

Having fully described my improvements, what I claim as my invention and desire to secure by Letters Patent of the United States is:

1. In a hose reel the combination with a support, a reel journaled thereon and provided with a projecting pin near its periphery, a spring arranged to turn the reel for winding a hose thereon, of a gravity latch pivotally secured on the support and formed with an inclined notch adapted to automatically engage or disengage the pin under respective different speeds of the reel by the action of the spring, for the purpose specified, and a fixed stop for limiting the disengaging movement of the latch.

2. In a hose reel the combination of a support, a reel journaled thereon and provided with a projecting pin on one end near its periphery, a spring arranged to turn the reel for winding the hose thereon, a gravity latch pivotally secured to the support in the path of the pin and formed with a rearwardly inclined notch adapted to detachably engage with the pin, for locking or releasing the reel as actuated by the spring under respective different predetermined speeds, and fixed stops for limiting the movement of the latch in respective opposite directions.

ADAM HEIM.

Witnesses:
 GEO. W. PIGMAN,
 WALTER J. MILLER.